(12) United States Patent
Daane et al.

(10) Patent No.: US 8,221,005 B2
(45) Date of Patent: Jul. 17, 2012

(54) STEPPED CONNECTOR

(75) Inventors: Laurence A. Daane, Newberg, OR (US); Matthijs P. Smits, Portland, OR (US)

(73) Assignee: Tyco Electronics Corporation, Berwyn, PA (US)

( * ) Notice: Subject to any disclaimer, the term of this patent is extended or adjusted under 35 U.S.C. 154(b) by 58 days.

(21) Appl. No.: 12/378,401

(22) Filed: Feb. 12, 2009

(65) Prior Publication Data

US 2009/0220196 A1 Sep. 3, 2009

Related U.S. Application Data

(60) Provisional application No. 61/028,060, filed on Feb. 12, 2008.

(51) Int. Cl.
*G02B 6/36* (2006.01)
(52) U.S. Cl. .......................................... 385/53
(58) Field of Classification Search ............... 385/53
See application file for complete search history.

(56) References Cited

U.S. PATENT DOCUMENTS

| 4,060,887 | A | 12/1977 | De Groef |
| 5,574,815 | A | 11/1996 | Kneeland |
| 6,106,486 | A | 8/2000 | Tenerz et al. |
| 6,416,334 | B1 * | 7/2002 | Plishner ................ 439/75 |
| 2004/0253874 | A1 | 12/2004 | Plishner |

FOREIGN PATENT DOCUMENTS

| EP | 0247874 A | 12/1987 |
| JP | 63-301419 A | 12/1988 |
| WO | WO-2006/007421 A | 1/2006 |

OTHER PUBLICATIONS

European Search Report for International Application No. PCT/US2009/000923, mailed May 11, 2009.

* cited by examiner

*Primary Examiner* — Sung Pak

(57) ABSTRACT

A connector is provided. The connector includes a body extending a length along a central longitudinal axis. The body includes first and second elements that each include opposite first and second end portions. A third element is positioned between at least a portion of the first and second elements. A portion of the third element and a portion of the first element extend within the second element. A portion of the first element extends within the third element. The first end portions of the first and second elements are exposed with respect to the third element. The second end portions of the first and second elements are exposed with respect to the third element. The exposed first end portions of the first and second elements are spaced apart with respect to each other along the length of the body. The exposed second end portions of the first and second elements are spaced apart with respect to each other along the length of the body. The length of the body extends no greater than approximately 152 millimeters (approximately 6 inches).

17 Claims, 10 Drawing Sheets

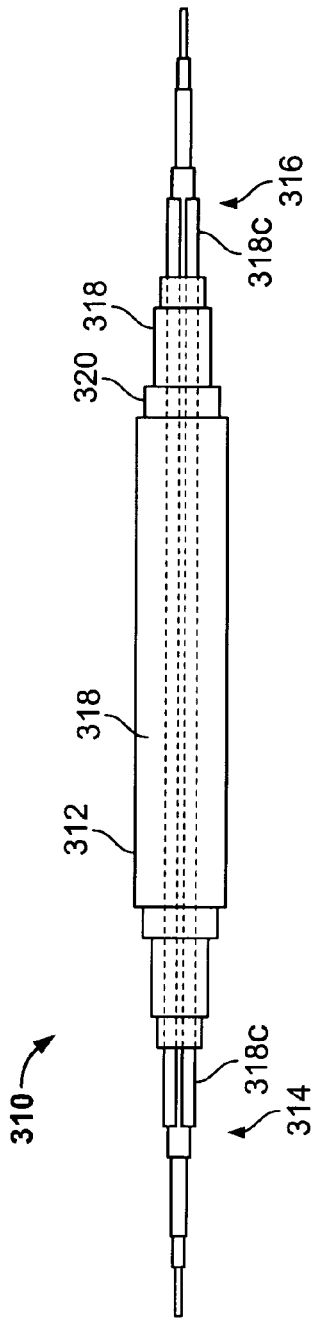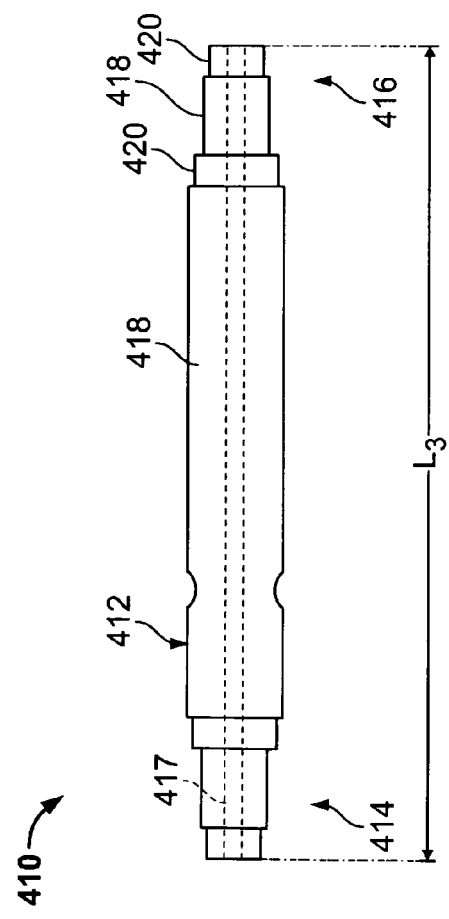
FIG. 8
FIG. 9

STEPPED CONNECTOR

The present application relates to and claims priority from Provisional Application Ser. No. 61/7028,060 filed Feb. 12, 2008 titled "STEPPED CONNECTOR", the complete subject matter of which is hereby expressly incorporated in its entirety.

BACKGROUND OF THE INVENTION

The subject matter herein relates generally to electrical, optical, and electrical/optical connectors and connector assemblies, and more particularly, to connectors and connector assemblies having stepped end portions.

Coaxial and circular electrical connector assemblies are sometimes used to interconnect various electrical components and/or devices. A coaxial electrical connector typically includes a pair of electrical conductors and an insulating element. The electrical conductors and the insulating element are positioned concentrically, or coaxially, about a central longitudinal axis of the connector. The insulating element extends between the electrical conductors such that the insulating element radially separates the electrical conductors. The radially innermost electrical conductor typically transmits electrical signals or electrical power, while the radially outermost electrical conductor serves as an electrical shield and/or ground path. However, because coaxial electrical connectors typically only include the single electrical conductor that transmits an electrical signal or electrical power, the number of signal or power transmissions that can be connected by the connector is limited to one.

Circular electrical connectors and combined optical/electrical connectors typically include a housing and a plurality of male and/or female contacts that are held within the housing. The contacts are held within the housing in an arrangement about a common central longitudinal axis of the housing. However, because of the arrangement of the contacts about the common central longitudinal axis, it may be difficult to reduce the diameter of the connector.

There is a need for a connector having a reduced size. There is also a need for a connector capable of connecting an increased number of signal, illumination, electrical power, mechanical power, and/or fluidic transmissions.

BRIEF DESCRIPTION OF THE INVENTION

In one embodiment, a connector is provided. The connector includes a body extending a length along a central longitudinal axis. The body includes first and second elements that each include opposite first and second end portions. A third element is positioned between at least a portion of the first and second elements. A portion of the third element and a portion of the first element extend within the second element. A portion of the first element extends within the third element. The first end portions of the first and second elements are exposed with respect to the third element. The second end portions of the first and second elements are exposed with respect to the third element. The exposed first end portions of the first and second elements are spaced apart with respect to each other along the length of the body. The exposed second end portions of the first and second elements are spaced apart with respect to each other along the length of the body. The length of the body extends no greater than approximately 152 millimeters (approximately 6 inches).

Optionally, at least one of the first and second elements is electrically conductive. At least one of the first and second elements optionally includes an optical material.

Optionally, the third element includes an optical material or is electrically conductive.

The body may optionally include a passageway extending through at least a portion of the length of the body.

In another embodiment, a connector assembly is provided. The connector assembly includes a housing and a plurality of connectors held by the housing. The plurality of connectors is held in an arrangement about a common central longitudinal axis of the housing. At least one of the plurality of connectors includes a body having first and second elements and a third element positioned between at least a portion of the first and second elements. A portion of the third element and a portion of the first element extend within the second element. A portion of the first element extends within the third element. End portions of the first and second elements are exposed with respect to the third element. A portion of the third element separates the exposed end portions of the first and second elements along a length of the body such that the exposed end portions of the first and second elements are spaced apart with respect to each other along the length of the body.

Optionally, the housing has a cylindrical shape such that the connector assembly is a circular connector assembly.

In another embodiment, a connector is provided. The connector includes a body having first and third elements. A portion of the first element extends within the third element. End portions of the first and third elements are exposed with respect to each other. The exposed end portions of the first and third elements are spaced apart with respect to each other along a length of the body. One of the first and third elements is electrically conductive and the other of the first and third elements includes an optical material.

Optionally, the body includes a second element, wherein a portion of each of the first and third elements extends within the second element.

BRIEF DESCRIPTION OF THE DRAWINGS

FIG. 8 is a side elevation view of another exemplary alternative embodiment of a stepped electrical connector.

FIG. 9 is a side elevation view of another exemplary alternative embodiment of a stepped electrical connector.

DETAILED DESCRIPTION OF THE INVENTION

Figure 1:
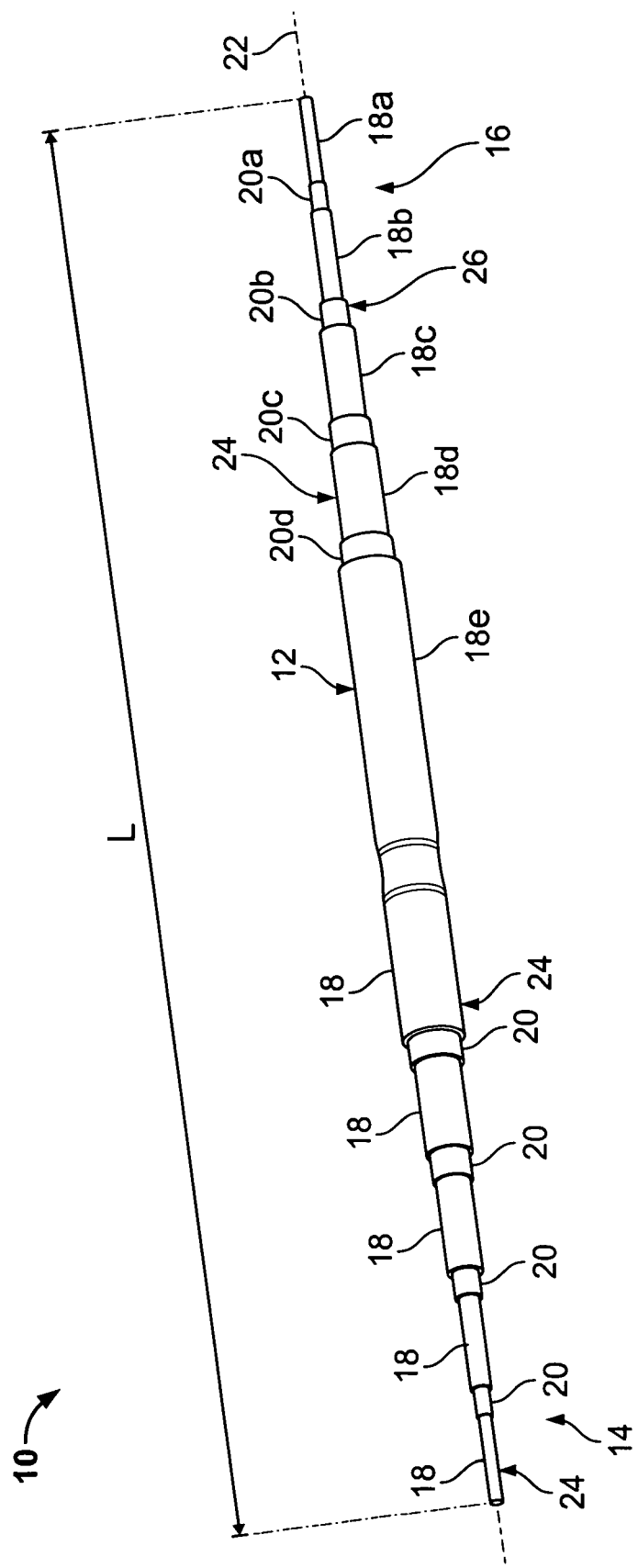
FIG. 1 is a side elevation view of an exemplary embodiment of a stepped electrical connector.

FIG. 1 is a side elevation view of an exemplary embodiment of a stepped connector 10. The connector 10 includes a body 12 extending a length L along a central longitudinal axis 22 between a pair of opposite end portions 14 and 16. As will be described in more detail below, in the exemplary embodiment of FIG. 1, the end portions 14 and 16 are each stepped. The body 12 is defined by a plurality of alternating elements 18 and 20 having a concentric structure. The elements 18 and 20 may each be referred to herein as a first element, a second element, and/or a third element. Each of the elements 18 may be selected to provide one or more desired properties, such as, but not limited to, electrical, optical, mechanical, insulating, and/or other properties. All of the elements 18 are not necessarily selected to provide the same property. Rather, some or all of the elements 18 may be selected to provide different properties from one or more of the other elements 18. Similar to elements 18, each of the elements 20 may be selected to provide one or more desired properties, such as, but not limited to, electrical, optical, mechanical, insulating, and/or other properties, so long as elements 18 and 20 that are directly adjacent one another do not have the same properties. All of the elements 20 are not necessarily selected to provide the same property. Rather, some or all of the elements 20 may be selected to provide different properties from one or more of the other elements 20. As an example, the elements 18 and 20 may each be, but are not limited to being, selected as an electrically conductive element, an insulating element, or may include an optical material such that the element has optical transmission capabilities. As used herein, the term "optical material" is defined as any optically transmissive material. Accordingly, and as should be apparent from the subject matter described herein, depending on the selection of the property of each element 18 and each element 20, the connector 10 may be an electrical connector, an optical connector, a combination electrical and optical connector, or a connector having another property or other property combinations.

When an element 18 is selected as an insulator, the element 18 electrically, optically, and/or thermally insulates, or isolates, the two elements 20 that are adjacent the insulating element 18 from each other. Similarly, when an element 20 is selected as an insulator, the element 20 electrically, optically, and/or thermally insulates the two elements 18 that are adjacent the insulating element 18 from each other. For example, an element 18 or 20 may be selected to electrically insulate two electrically conductive elements from each other, to optically insulate two optically transmissive elements from each other, or to insulate an optically transmissive element from an electrically conductive element. In some embodiments, an element 18 or 20 that is selected as an insulator may also have other properties, such as, but not limited to, electrically conductive or optically transmissive properties. For example, an element 18 or 20 that is selected to insulate two optically transmissive elements from each other may be electrically conductive. Similarly, and for example, an element 18 or 20 that is selected to insulate two electrically conductive elements from each other may include an optical material such that the electrically insulating element 18 or 20 is optically transmissive.

FIG. 1 illustrates that the radially innermost element of the body 12 is an element 18a. Alternatively, the radially innermost element of the body 12 may be an element 20. As will be described in more detail below with respect to FIG. 9, the radially innermost element may optionally include a passageway (not shown in FIG. 1; e.g., the passageway 417 shown in FIG. 9), for example to facilitate withdrawing and/or delivering fluid and/or solid substances, and/or to carry surgical or other tools. Although five elements 18 are shown and four elements 20 are shown, the body 12 may include any number of elements 18 and any number of elements 20. Depending on whether an element 18 or 20 is selected as the radially innermost element, the number of elements 18 may determine the number of elements 20, or vice versa.

In the exemplary embodiment of FIG. 1, the elements 18 and the elements 20 are each approximately cylindrical, and are each concentrically aligned about the central longitudinal axis 22 of the body 12. Accordingly, a cross section of the body 12 has a generally circular shape. Alternatively, the elements 18 and the elements 20 may have other shapes such that the body 12 may have other cross sectional shapes. Moreover, the elements 18 and/or the elements 20 may alternatively not be concentrically aligned. As can be seen in FIG. 1, the alternating elements 18 and 20 are nested within each other. Specifically, a portion of the radially innermost element 18a extends within an element 20a, a portion of the element 20a extends within an element 18b, a portion of the element 18b extends within an element 20b, a portion of the element 20b extends within an element 18c, a portion of the element 18c extends within an element 20c, a portion of the element 20c extends within an element 18d, a portion of the element 18d extends within an element 20d, and a portion of the element 20d extends within an element 18e. Accordingly, beginning with the element 18a and moving radially outward, each element has a larger diameter than the previous radially inner element.

As used herein, a "stepped end portion" refers to an end portion having structures (e.g., end portions 24 and 26 of some or all of the respective elements 18 and 20) that are: (1) spaced apart from one another along a length of the end portion such that at least some of the structures are located at different positions along the length of the end portion; and (2) spaced apart from one another radially with respect to a central longitudinal axis (e.g., the axis 22) of the end portion such that each structure is located a different radial distance from the central longitudinal axis. As described above, the end portions 14 and 16 of the connector body 12 are each stepped in the exemplary embodiment of FIG. 1. Specifically, in the exemplary embodiment of FIG. 1 each of the elements 18 and 20 has a different length. Beginning with the element 18a and moving radially outward, each element 18a through 18e has a shorter length than the previous radially inner element 18, and each element 20a through 20d has a shorter length than the previous radially inner element 20. An end portion 24 of each element 18 is exposed with respect to the radially outer adjacent element 20, and an end portion 26 of each element 20 is exposed with respect to the radially outer adjacent element 18. The exposed end portions 24 of the elements 18 are spaced apart from each other along the length L of the body such that each of the end portions 24 is located at a different position along the length L of the body 12. Similarly, the exposed end portions 26 of the elements 20 are spaced apart from each other along the length L of the body such that each of the end portions 26 is located at a different position along the length L of the body 12.

The exposed end portions 24 are also spaced apart from each other radially with respect to the central longitudinal axis 22 of the body such that each end portion 24 is located a different radial distance from the central longitudinal axis 22.

Similarly, the exposed end portions 26 are also spaced apart from each other radially with respect to the central longitudinal axis 22 of the body such that each end portion 26 is located a different radial distance from the central longitudinal axis 22. Although both end portions 14 and 16 of the connector body 12 are stepped in FIG. 1, alternatively only one of the end portions 14 or 16 of the connector body 12 may be stepped. Moreover, although in FIG. 1 the end portions 14 and 16 of the connector body 12 are each evenly stepped such that the end portions 24 of the elements 18 are each spaced apart from adjacent end portions 24 by approximately the same radial and longitudinal distance, and such that the end portions 26 are each spaced apart from adjacent end portions 26 by approximately the same radial and longitudinal distance, the end portion 14 and/or the end portion 16 may alternatively be unevenly stepped such that some or all of the end portions 24 are spaced apart from adjacent end portions 24 by different radial and/or longitudinal distances and/or some or all of the end portions 26 are spaced apart from adjacent end portions 26 by different radial and/or longitudinal distances.

Figure 11:
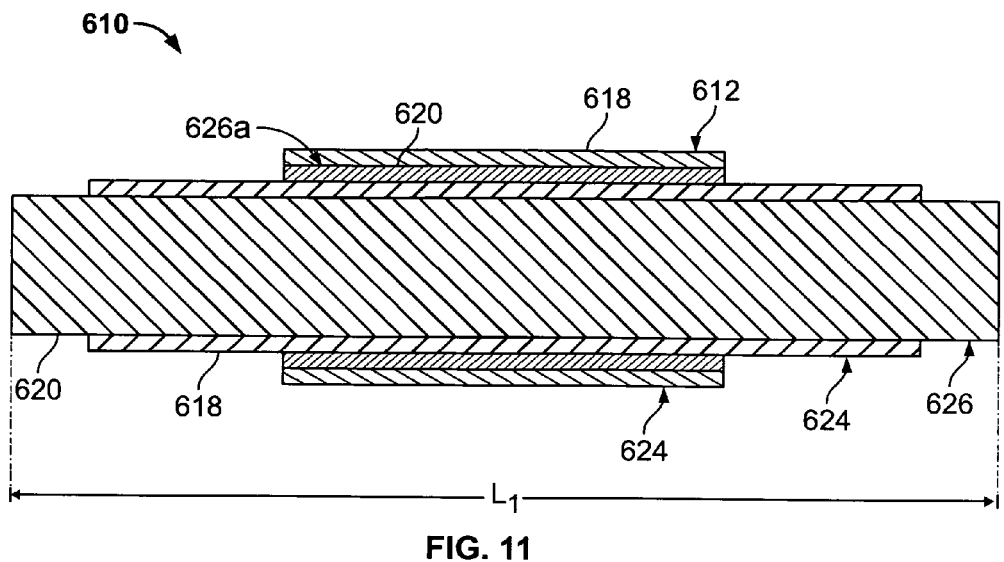
FIG. 11 is a cross-sectional view of another exemplary alternative embodiment of a stepped electrical connector.

In the exemplary embodiment of FIG. 1, the end portion 24 of each element 18 extends along the length of the body 12 past the end portion 26 of the radially outer adjacent element 20 such that each end portion 24 is exposed (when viewed in a substantially similar orientation as FIG. 1) between the end portions 26 of the two adjacent elements 20. Similarly, the end portion 26 of each element 20 extends along the length of the body 12 past the end portion 24 of the radially outer adjacent element 18 such that each end portion 26 is exposed (when viewed in a substantially similar orientation as FIG. 1) between the end portions 24 of the two adjacent elements 18. Alternatively, the end portions 24 of one or more elements 18 do not extend, along the length L of the body 12, past the end portion 26 of the radially outer adjacent element 20 such that the end portion(s) 24 is not exposed (when viewed in a substantially similar orientation as FIG. 1) between the end portions 26 of the two adjacent elements 20. Similarly, the end portions 26 of one or more elements 20 may not extend, along the length L of the body 12, past the end portion 24 of the radially outer adjacent element 18 such that the end portion(s) 26 is not exposed (when viewed in a substantially similar orientation as FIG. 1) between the end portions 24 of the two adjacent elements 18. For any element 18 that is radially inner and adjacent an unexposed (when viewed in a substantially similar orientation as FIG. 1) end portion 26 of an element 20, more of the length of the element 18 will be exposed (when viewed in a substantially similar orientation as FIG. 1) than is shown in FIG. 1. Similarly, for any element 20 that is radially inner and adjacent an unexposed (when viewed in a substantially similar orientation as FIG. 1) end portion 24 of an element 18, more of the length of the element 20 will be exposed (when viewed in a substantially similar orientation as FIG. 1) than is shown in FIG. 1. FIG. 11 illustrates an exemplary embodiment of a stepped connector 610 wherein the end portion 626a of an element 620 does not extend, along a length $L_1$ of a body 612 of the connector 610, past the end portion 624 of the radially outer adjacent element 618 such that the end portion 626a is not exposed (when viewed in a substantially similar orientation as FIG. 11) between the end portions 624 of the two adjacent elements 618. The end portions 24, 26, 624, and 626 may each be referred to herein as a first and/or a second end portion. The elements 618 and 620 may each be referred to herein as a first element, a second element, and/or a third element.

Figure 12:
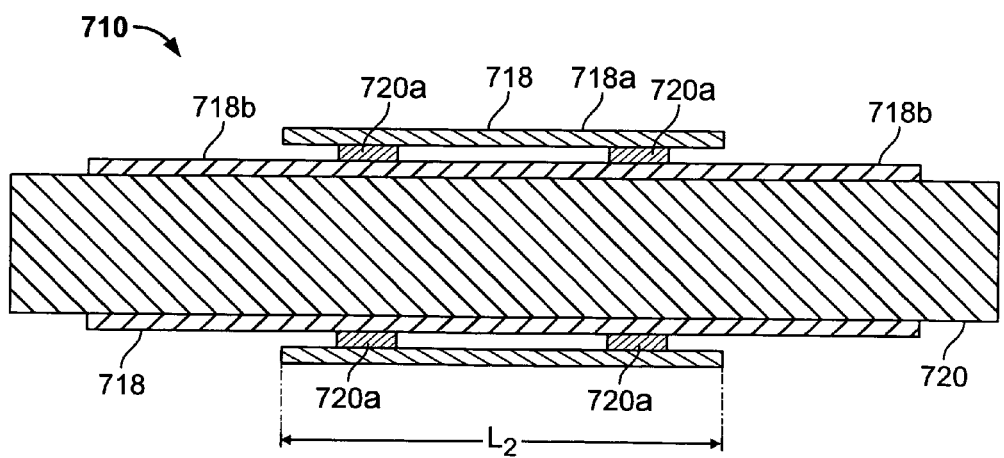
FIG. 12 is a cross-sectional view of another exemplary alternative embodiment of a stepped electrical connector.

Each of the elements 18 need not extend continuously along the length of the corresponding radially outer adjacent element 20 as is shown in FIG. 1. Similarly, each of the elements 20 need not extend continuously along the length of the corresponding radially outer adjacent element 18. Rather, one or more elements 18 and/or 20 may extend along only a portion of the length of the corresponding radially outer adjacent element. FIG. 12 illustrates an exemplary embodiment of a stepped connector 710 wherein an element 720a extends along only a portion of the length $L_2$ of a corresponding radially outer adjacent element 718a. Although two elements 720a are shown as positioned between the element 718a and an element 718b at different locations along the length $L_2$ of the element 718a, any number of elements 720a may be positioned between the element 718a and the element 718b at different locations along the length $L_2$ of the element 718a. The elements 718 and 720 may each be referred to herein as a first element, a second element, and/or a third element.

Figure 2:
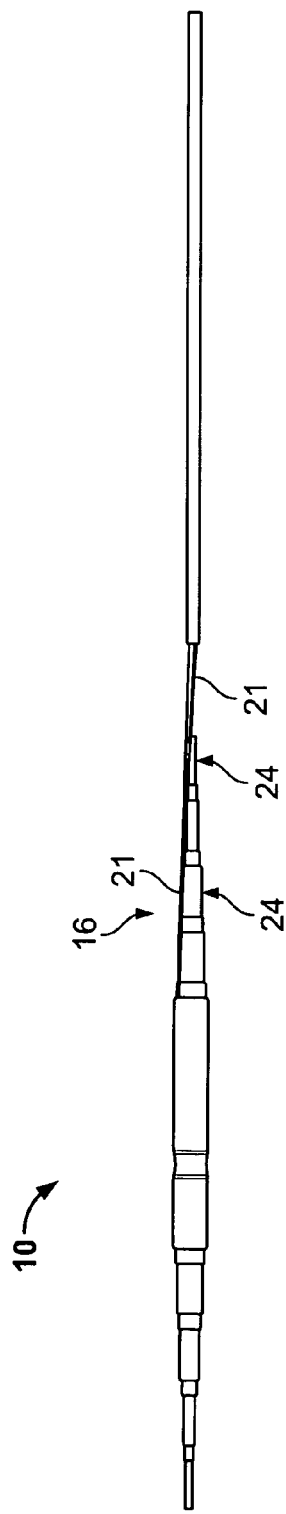
FIG. 2 is a side elevation view of the stepped electrical connector shown in FIG. 1 illustrating an end portion of the connector being electrically connected with a plurality of electrically conductive wires.
Figure 3:
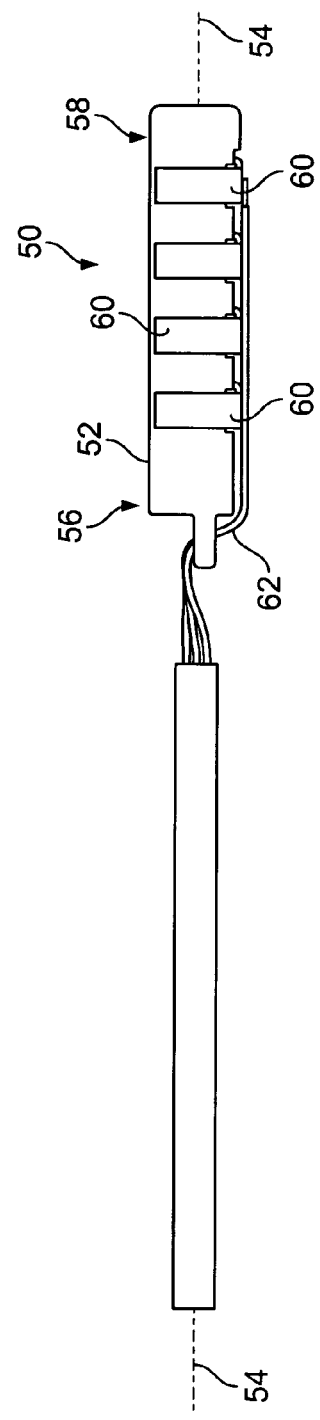
FIG. 3 is a side elevation view of an exemplary embodiment of a receptacle connector that may be used with the stepped electrical connector shown in FIGS. 1 and 2.
Figure 4:
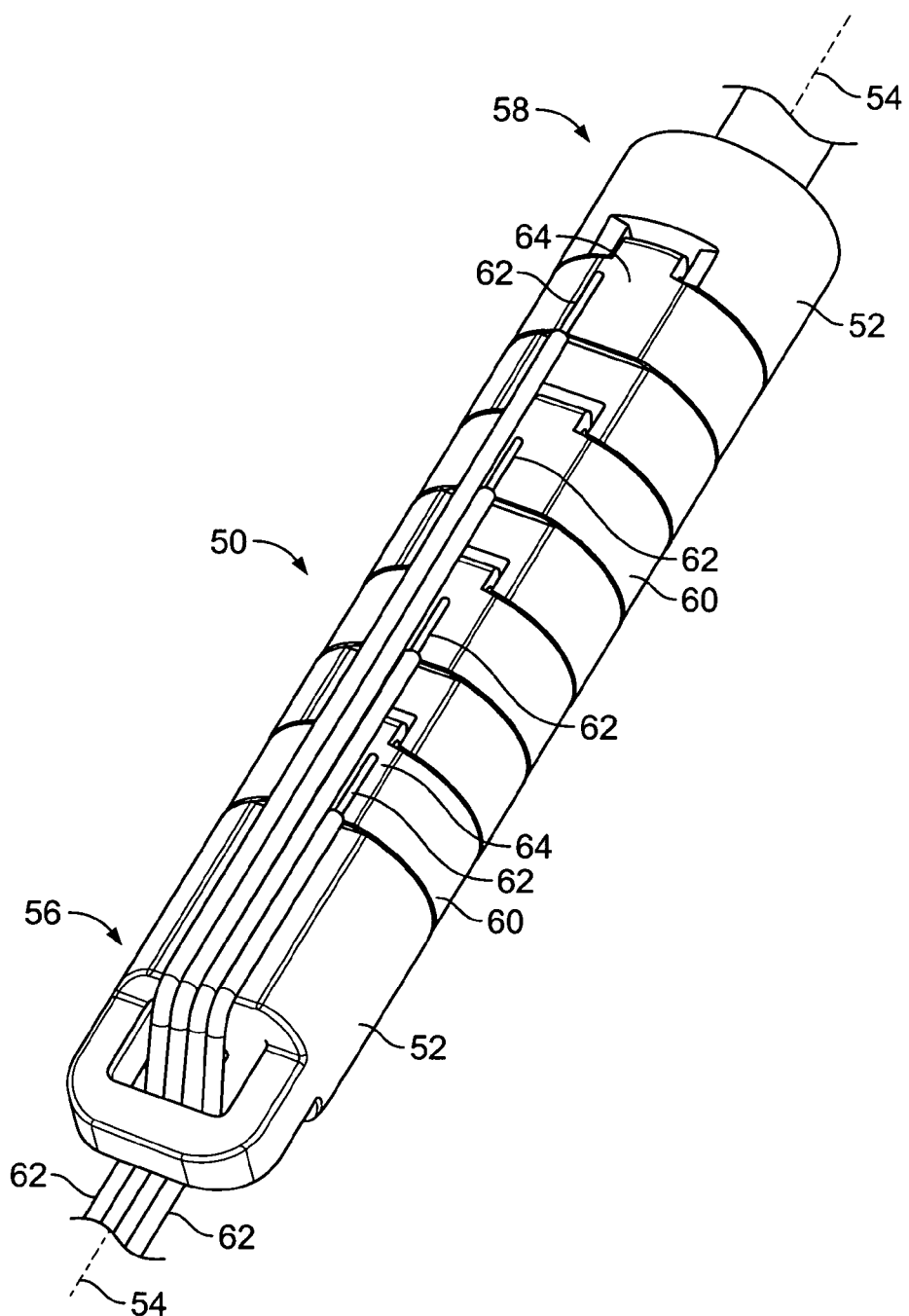
FIG. 4 is a perspective view of the receptacle connector shown in FIG. 3.
Figure 5:
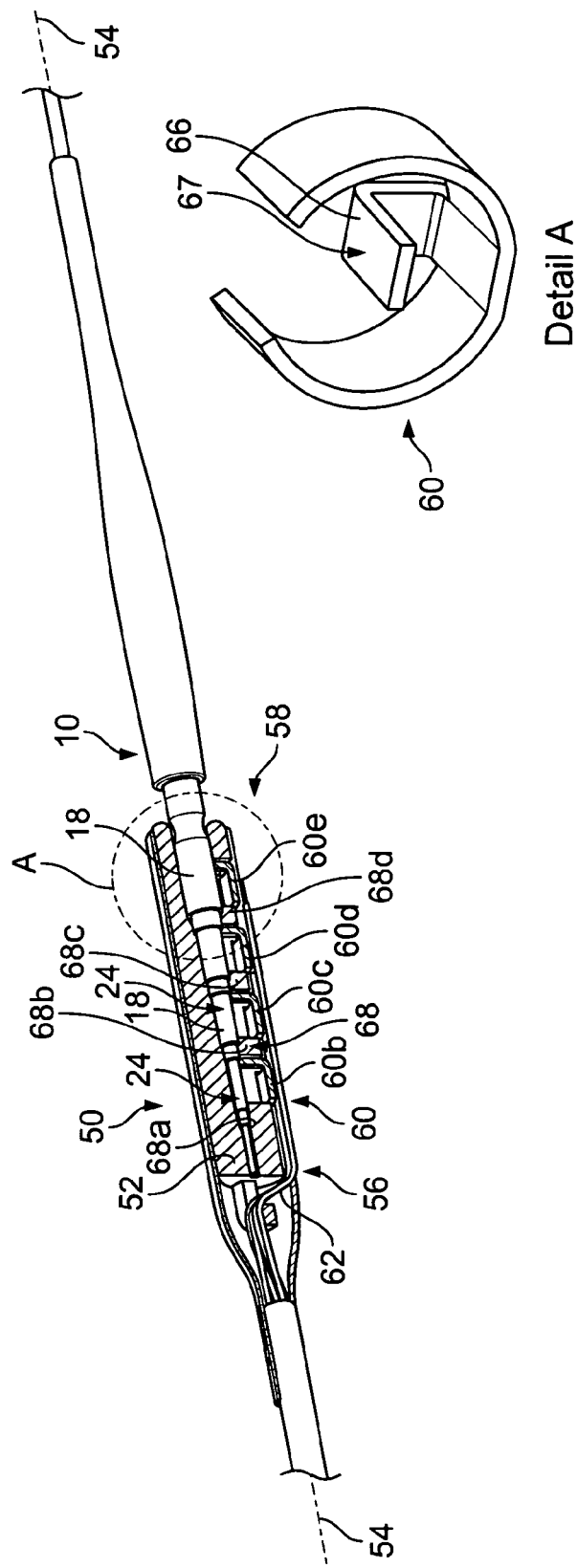
FIG. 5 is a partially broken away perspective view of the stepped electrical connector shown in FIGS. 1 and 2 mated with the receptacle connector shown in FIGS. 3 and 4.
Figure 6:
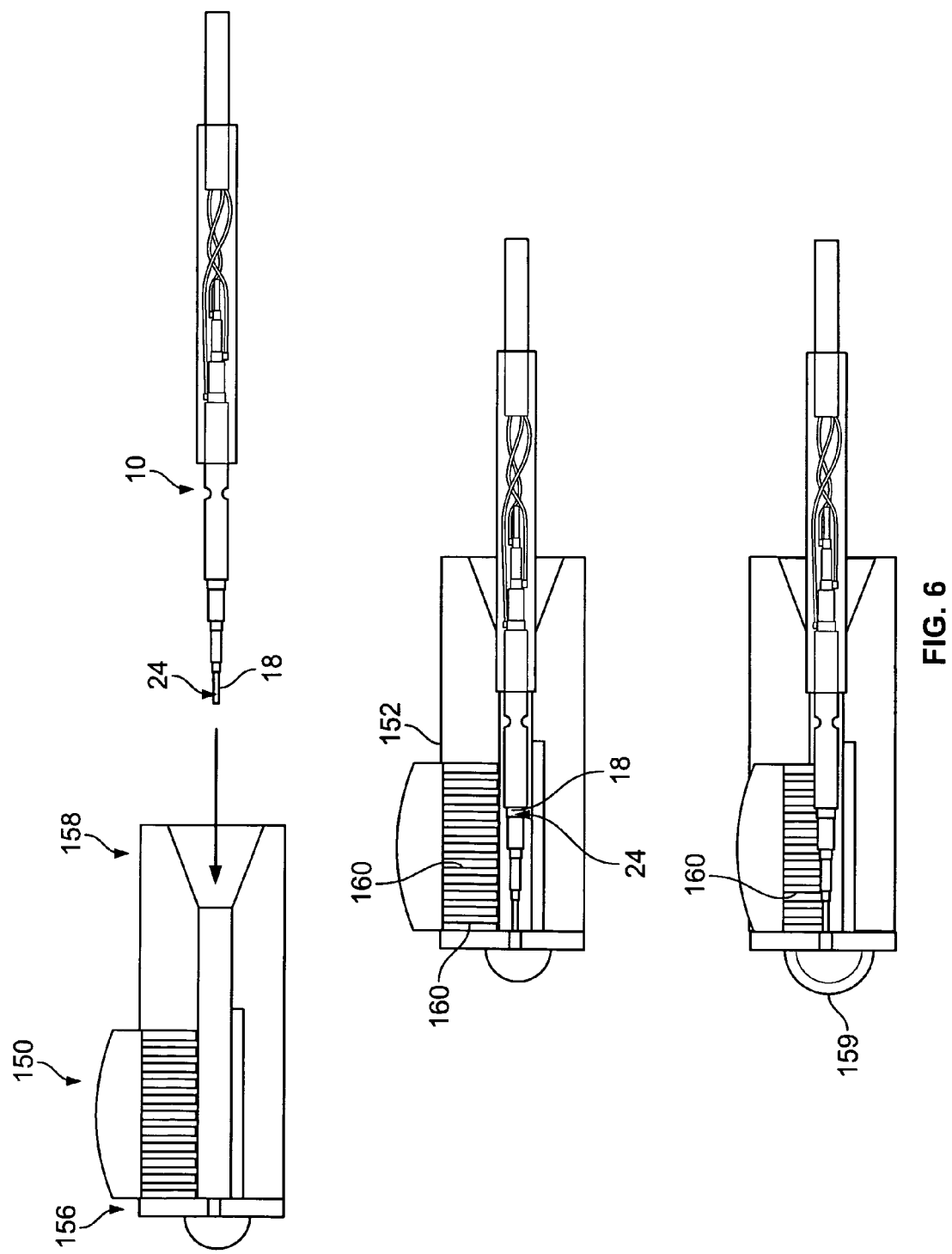
FIG. 6 is a cross-sectional view illustrating an exemplary alternative embodiment of a receptacle connector that may be used with the stepped electrical connector shown in FIGS. 1 and 2.
Figure 13:
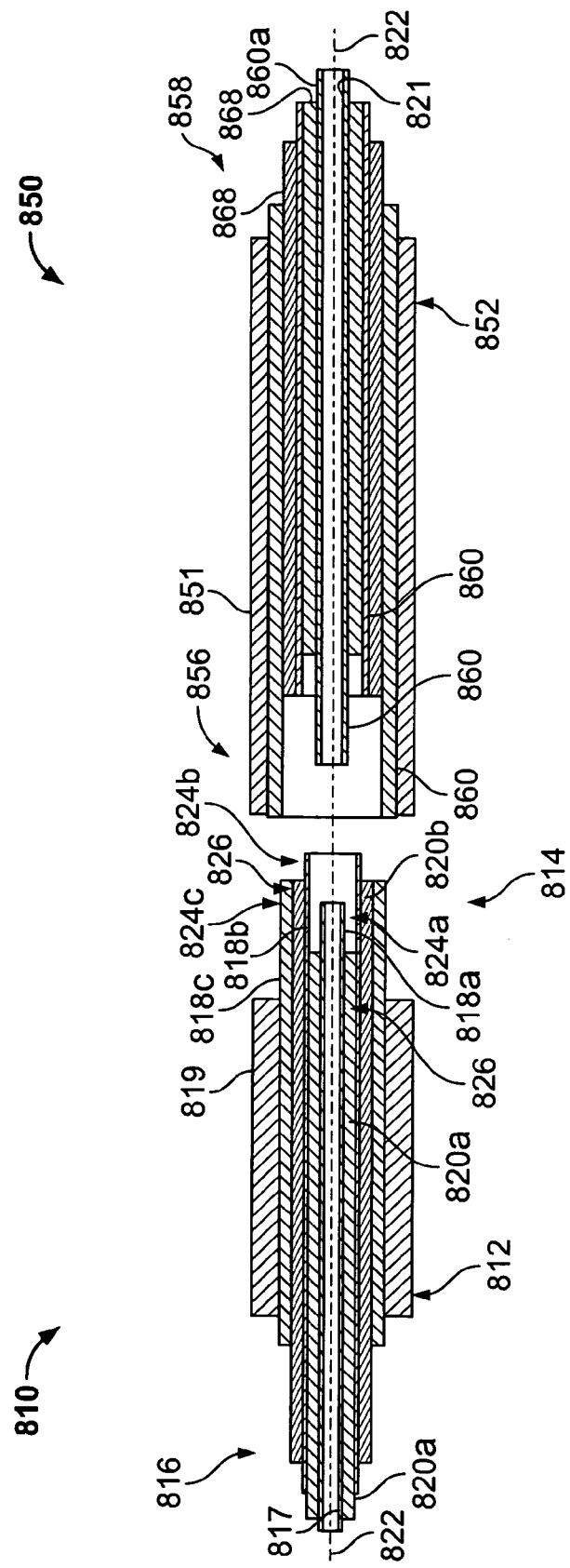
FIG. 13 is a cross sectional view of an exemplary alternative embodiment of a stepped connector and a receptacle connector for use with the stepped connector.

Referring again to FIG. 1, each of the end portions 14 and 16 of the body 12 may connect to any suitable component or device, such as, but not limited to, a circuit board (not shown), wires or cables (such as, but not limited to, the wires 21 shown in FIG. 2), another connector (such as, but not limited to, a stepped connector (such as, but not limited to, the stepped connector 850 shown in FIG. 13) or a receptacle connector (such as, but not limited to, the receptacle connector 50 shown in FIGS. 3-5 or the receptacle connector 150 shown in FIG. 6)), and/or the like. Specifically, the end portions 24 of the elements 18 and the end portions 26 of the elements 20 may each be connected to electrical or optical leads and/or contacts (not shown) of the component or device, such as, but not limited to contacts of the circuit board, the wires or cables (either leads and/or contacts thereof or the wires or cables themselves), elements of the receptacle connector, and/or the like. The end portions 24 and 26 may connect to the leads, elements, and/or contacts using any suitable structure, method, means, and/or the like, such as, but not limited to, soldering, welding, crimping, adhesive, frictional and/or stictional engagement (e.g., an interference fit), and/or the like. In some embodiments, deformation and/or alignment of the end portions 24 of the elements 18 and/or the end portions 26 of the elements 20 may facilitate providing a desired compliance for electrical or optical connection. Moreover, some or all of the end portions 24 and/or 26 may include a chamfer or other shape that facilitates providing a smoother transition between each element 18 and 20, i.e., between each step of the body 12.

FIG. 2 illustrates the end portion 16 of the connector 10 being electrically connected with a plurality of electrically conductive wires 21. Specifically, each of the end portions 24 of the elements 18 is electrically connected to a corresponding electrically conductive wire 21.

Referring again to FIG. 1, the leads, elements, and/or contacts of the component or device that connects to the end portions 24 and/or 26 may engage an entire circumference of the end portion 24 and/or 26 or alternatively may only engage a portion of the circumference. Because, in the exemplary embodiment of FIG. 1, the end portions 24 of the elements 18 and the end portions 26 of the elements 20 form a continuous and unbroken cross sectional shape (which is approximately circular in the exemplary embodiment), the connection between the leads, elements, and/or contacts and the end portions 24 and/or 26 may be maintained during rotation of the body 12 and/or the component or device.

The length L of the connector body 12 may extend any length that is suitable for the particular component(s) and/or device(s) that the connector 10 may be used with. In some embodiments, the length L of the connector body 12 extends no greater than approximately 152 millimeters (approximately 6 inches). Moreover, in some embodiments the length L of the connector body 12 extends no greater than approximately 102 millimeters (approximately 4 inches). Further, in some embodiments the length L of the connector body 12 extends no greater than approximately 38 millimeters (approximately 1.5 inches). Despite the above described limitations of the length L of the connector body 12, in some embodiments the length L of the connector body 12 extends greater than approximately 152 millimeters (approximately 6 inches). The dimensions and/or the materials of the connector 10 are modifiable to meet specific application desires or requirements. For example, on the distal end of a catheter it may be desirable to induce or maintain smooth curvatures and minimize any rigid portions that compromise such curvature. Such rigid portions may be less than approximately 25 millimeters (approximately 1 inch) in length, and it may therefore be desirable to make the length L of the connector body 12 shorter and/or make the diameter of the connector body 12 smaller. In another example where manual dexterity and/or the ability to grip the connector 10 may be helpful or required to mate and/or demate the connector 10, the size of the connector 10 may be based on ergonomic considerations. In such a case wherein the size of the connector 10 is based on ergonomic considerations, the length L of the connector body 12 may be approximately 152 millimeters (approximately 6 inches) or shorter. In still another example wherein electrical and/or mechanical robustness is desired, the use of higher capacity electrical and/or optical elements 18 and/or 20, and/or making elements 20 thicker and/or longer, may be considered. In such a case wherein the use of higher capacity electrical and/or optical elements 18 and/or 20, and/or making elements 20 thicker and/or longer, is considered, the connector could be up to approximately 305 millimeters (approximately 12 inches), or even longer.

When an element 18 or 20 is an electrically conductive element, the element may be fabricated from any suitable electrically conductive material that enables the element to function as described and/or illustrated herein, such as, but not limited to, silver, aluminum, gold, copper, other metallic conductors, other non-metallic conductors, electrically conductive inks, other electrically conductive coatings, optically transmissive coatings, insulative coatings, and/or the like. In some embodiments, the element may be fabricated by plating or coating the radially inner adjacent element 18 or 20 with the electrically conductive material(s). Some or all of the elements 18 and/or 20 may optionally be fabricated from different material(s) from each other to provide the elements 18 and/or 20 with different electrical properties. Moreover, some or all of the elements 18 and/or 20 may have different thicknesses from each other to provide the elements 18 and/or 20 with different electrical properties. The different electrical properties that may be provided by the different material(s) and/or thicknesses may include any electrical properties, such as, but not limited to, electrical conductivity, current carrying capability, electrical conductance, direct current resistance (DCR), inductance, voltage withstand, dielectric withstand, impedance, capacitance, electrical power carrying capability (such as, but not limited to, for providing therapeutic stimulation to bodily tissues), sensing and/or detection capabilities, and/or the like. Additionally or alternatively, the different material(s) and/or thicknesses may provide some or all of the elements 18 and/or 20 with different properties other than electrical properties, such as, but not limited to, chemical properties, mechanical properties, and/or the like. Examples of chemical properties and mechanical properties include, but are not limited to, permeability, drug elution, lubricity, stiffness, transmitting mechanical power, and/or the like. Moreover, some or all of the elements 18 and/or 20 may be provided with different functional components, such as, but not limited to, active functional components, passive functional components, inductors, capacitors, resistors, components that transmit mechanical power, circuitry, active electrical components, and/or the like. The functional components may be provided by a shape of the element(s) 18 and/or 20 (such as, but not limited to, a helical shape that forms an inductor) and/or the functional component may be a separate component from the element(s) 18 and/or 20 that is held by the element(s) 18 and/or 20 (such as, but not limited to, an embedded chip).

When an element 18 or 20 fabricated from an optical material, the element may be fabricated from any suitable optical material, such as, but not limited to, a fiber optic material and/or the like. Any elements 18 and/or 20 that are fabricated from optical materials may provide the element with optical transmission capabilities (such as, but not limited to, optical detection, optical illumination, optical sensing, optical signaling, power delivery, and/or the like). The optical transmission capabilities may provide the element 18 and/or 20 with sensing and/or detecting capabilities, such that the element is configured to sense and/or detect something. Some or all of the elements 18 and/or 20 may optionally be fabricated from different material(s) from each other to provide the elements 18 and/or 20 with different optical properties. Moreover, some or all of the elements 18 and/or 20 may have different thicknesses from each other to provide the elements 18 and/or 20 with different optical properties. The different optical properties that may be provided by the different material(s) and/or thicknesses may include any optical properties, such as, but not limited to, optical detection, optical illumination, optical sensing, optical signaling, power delivery, and/or the like.

When an element 18 or 20 is selected as an insulator, the element may be fabricated from, but is not limited to being fabricated from, polyester (e.g., Mylar®), polyimide (e.g., Kapton®), thermoplastics, thermosets, powder coatings, dip coatings, dispersion coatings, vacuum deposited materials, heat recoverable tubing, an electrically conductive material, an optical material, and/or the like.

FIG. 3 is a side elevation view of an exemplary embodiment of a receptacle connector 50 that may be used with the stepped connector 10 (FIGS. 1 and 2). FIG. 4 is a perspective view of the connector 50. FIG. 5 is a partially broken away perspective view of the connector 10 mated with the connector 50. The connector 50 includes a housing 52 that extends a length along a central longitudinal axis 54 between a pair of opposite end portions 56 and 58. The housing 52 holds a plurality of elements 60. The elements 60 are most clearly illustrated in Detail A of FIG. 5. The elements 60 are each selected to have the property of the corresponding element 18 to which the element 60 is configured to engage, such as, but not limited to, electrical, optical, mechanical, insulating, and/or other properties. In the exemplary embodiment of FIGS. 3-5, each of the elements 60 is connected to a corresponding wire 62 at an engagement surface 64 of the element 60.

The elements 60 are held by the housing 52 such that the elements 60 are spaced apart from each other along the length of the housing 52. In some embodiments, for example when an element 60 is selected as electrically conductive or optically transmissive, the element 60 is positioned along the length of the housing 52 such that an engagement surface 66 of a contact portion 67 of the element 60 is longitudinally positioned to engage the end portion 24 of a corresponding one of the elements 18 of the connector 10 when the connector 10 is mated with the connector 50. However, in other embodiments, for example when an element 60 is selected as an insulator, the element 60 may not engage the end portion 24 of the corresponding element 18 when the connector 10 is mated with the connector 50.

As can be seen in FIG. 5, in the exemplary embodiment of FIGS. 3-5, the engagement surfaces 66 are each radially spaced a different distance from the central longitudinal axis 54 of the housing 52 such that the engagement surfaces 66 are each radially positioned, with respect to the axis 54, to engage the end portion 24 of the corresponding element 18 of the connector 10. Accordingly, the elements 60 form a stepped receptacle connector 50. Specifically, beginning with an element 60*e* that is closest to the end portion 58 and moving toward the end portion 56, the engagement surface 66 of each successive element 60*e*, 60*d*, 60*c*, and 60*b* is positioned radially closer to the axis 54. In the exemplary embodiment of FIGS. 3-5, the housing 52 does not include an element 60 that engages the end portion 24 of the element 18*a* of the connector 10.

In an alternative embodiment, rather than each of the engagement surfaces 66 being radially spaced a different distance from the central longitudinal axis 54 of the housing 52, some or all of the engagement surfaces 66 are initially radially spaced at approximately the same distance from the central longitudinal axis 54 but have enough compliance such that when the connectors 10 and 50 are mated together each of the engagement surfaces 66 can be deformed by contact with the end portion 24 of the corresponding element 18 into the different radial position, with respect to the axis 54, of the corresponding end portion 24.

In the exemplary embodiment of FIGS. 3-5, the contact portions 67 of the elements 60 do not form a continuous closed cross sectional shape such that the elements 60 engage only a portion of the circumference of the end portion 24 of the corresponding element 18. However, the contact portions 67 of the elements 60 may alternatively be formed as a continuous closed cross sectional shape (e.g., a circle or other closed shape, such as, but not limited to, a rectangle) such that they completely surround the entire circumference of at least a portion of the end portion 24 of the corresponding element 18. In such an alternative embodiment, depending upon whether the contact portion 67 is shaped similarly to the end portions 24 of the elements 18, the engagement surfaces 66 may engage the entire circumference of at least a portion of the corresponding end portion 24. Moreover, although in the exemplary embodiment of FIGS. 3-5 each element 60 only includes one contact portion 67, in some embodiments one or more of the elements 60 includes a plurality of contact portions 67 that are spaced apart along an arc (such as, but not limited to, a circle) such that each of the plurality of contact portions 67 of one element 60 is configured to engage a different portion of the circumference of the same corresponding end portion 24.

The housing 52 includes a plurality of elements 68 that extend radially inward toward the axis 54 and engage the end portion 26 of a corresponding one of the elements 20. The elements 68 are each selected to have the property of the corresponding element 20 to which the elements 68 is configured to engage, such as, but not limited to, electrical, optical, mechanical, insulating, and/or other properties. Accordingly, and as should be apparent from the subject matter described herein, depending on the selection of each element 60 and each elements 68 as electrically conductive, optically transmissive, or otherwise, the connector 50 may be an electrical connector, an optical connector, a combination electrical and optical connector, or a connector having another property or other property combinations. In some embodiments, for example when an element 68 is selected as electrically conductive or optically transmissive, the element 68 is positioned along the length of the housing 52 such that the element 68 is longitudinally positioned to engage the end portion 26 of a corresponding one of the elements 20 of the connector 10 when the connector 10 is mated with the connector 50. However, in other embodiments, for example when an element 68 is selected as an insulator, the element 68 may not engage the end portion 26 of the corresponding element 20 when the connector 10 is mated with the connector 50.

In some embodiments, the elements 68 may facilitate supporting the elements 20 as well as the body 12 of the connector 10 overall, and/or may facilitate maintaining connection between the connectors 10 and 50 via stiction between the elements 68 and the end portions 26 of the elements 20. As with the elements 60, beginning with an element 68*d* that engages the element 20*d* and moving toward the end portion 56, each successive element 68*d*, 68*c*, 68*b*, and 68*a* is positioned radially closer to the axis 54.

In some embodiments, the connectors 10 and/or 50 may include latching features that facilitate maintaining connection between the connector 10 and the connector 50 or between the connector 10 and any other component or device. The connectors 10 and 50 may each include any suitable latching structure, means, and/or the like that facilitates maintaining the connection, such as, but not limited to, an interlocking latching arrangement, a frictional and/or stictional latching arrangement, a detent and recess latching arrangement, a bayonet-type latching arrangement, a material deformation latching arrangement, a frictional and/or stictional arrangement, a snap-fit arrangement, and/or the like. Moreover, in some embodiments, the connectors 10 and/or 50 may include features that indicate whether the connector 10 is fully mated with the connector 50 or with the other component or device. The connectors 10 and/or 50 may each include any suitable structure, means, and/or the like that indicates whether the connector 10 is fully mated with the connector 50 or the other component or device, such as, but not limited to, an audio indication, a visual indication, and/or the like.

FIG. 6 is a cross sectional view illustrating an exemplary alternative embodiment of a receptacle connector 150 that may be used with the stepped connector 10. The connector 150 includes a housing 152 that extends a length between a pair of opposite end portions 156 and 158. The housing 52 holds a plurality of elements 160. In contrast to the connector 50 (FIGS. 3-5), the connector 150 is not initially a stepped receptacle connector. Rather, the elements 160 are formed within a compressible material that deforms to the stepped shape of the connector 10 such that the elements 160 engage the end portions 24 of the elements 18. In some embodiments, the compressible material is a z-axis material that only conducts electricity in one direction. The connector 150 includes an optional visual indicator 159 that indicates when the connectors 150 and 10 are fully mated.

Figure 7:
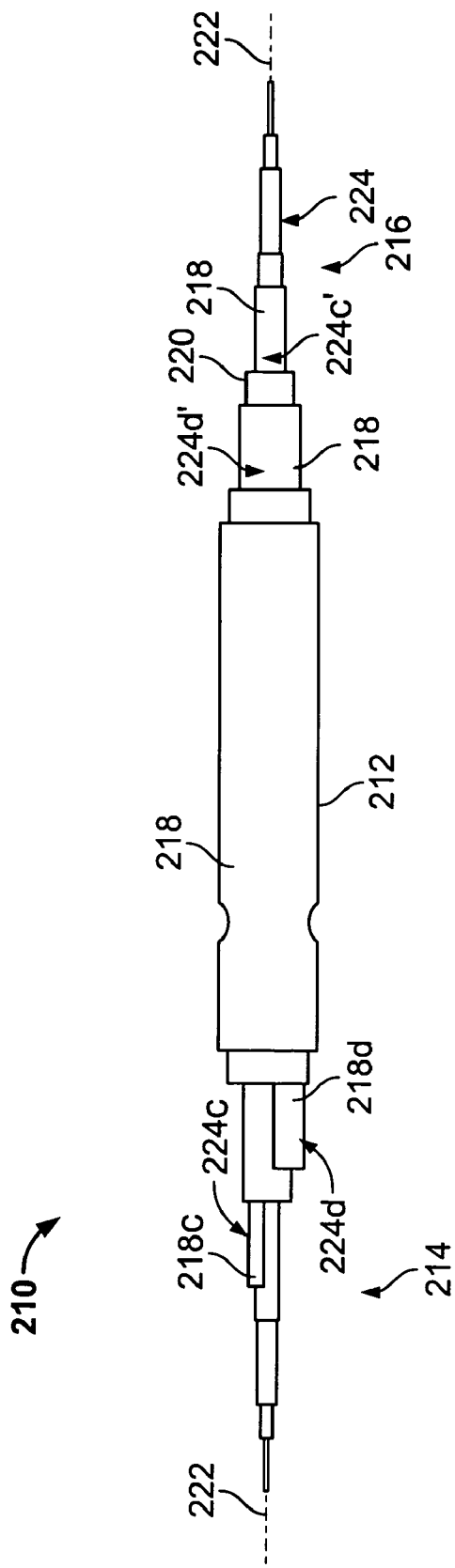
FIG. 7 is a side elevation view of an exemplary alternative embodiment of a stepped electrical connector.

FIG. 7 is side elevation view illustrating an exemplary alternative embodiment of a stepped connector 210. The connector 210 includes a body 212 extending a length along a central longitudinal axis 222 of the body 212 between a pair of opposite end portions 214 and 216. The body 212 is defined by a plurality of alternating elements 218 and 220. Similar to the connector 10 (FIGS. 1, 2, and 5), in the exemplary embodiment of FIG. 7, the end portions 214 and 216 are each stepped. The elements 218 and 220 may each be referred to herein as a first element, a second element, and/or a third element.

With regard to the connector 10, each of the end portions 24 of the elements 18 (FIGS. 1 and 5) forms a continuous closed cross sectional shape such that each of the end portions 24 extends completely around the entire circumference of at least a portion of the body 12 (FIG. 1). In contrast, end portions 224 of some of the elements 218 do not form a continuous closed cross sectional shape such that they extend around only a portion of the circumference of the body 212. As can be seen in FIG. 7, the end portions 224c and 224d of the elements 218c and 218d, respectively, extend around only a portion of the circumference of the body 212 at the end portion 214 of the body 212. The end portions 224c and 224d that extend around only a portion of the circumference of the body 212 are positioned at different positions on the circumference of the body 212. Accordingly, when the connector 210 is mated with a receptacle connector (such as, but not limited to, the receptacle connector 50 shown in FIGS. 3-5 or the receptacle connector 150 shown in FIG. 6), a first rotational position of the connector 210 about the axis 222 may connect (e.g., electrically or optically) the end portion 224c with an element of the receptacle connector while the end portion 224d is not connected with another element of the receptacle connector. The connector 210 could then be rotated about the axis 222 to a second rotational position wherein the end portion 224c is connected with the corresponding element of the receptacle connector and the end portion 224d is not connected to the corresponding element. As should be understood, the relative positions of the elements of the receptacle connector and the relative positions of each of the end portions 224 that extend around only a portion of the circumference of the body 212 may be selected to provide a variety of different rotational positions wherein different end portions 224 are connected with the corresponding element of the receptacle connector. The end portions 224 may each be referred to herein as a first and/or a second end portion.

In the exemplary embodiment of FIG. 7, the end portions 224c and 224d extend around only a portion of the circumference of the body 212 at the end portion 214 of the body 212, while at the end portion 216 of the body 212 the corresponding end portions 224c' and 224d' extend completely around the entire circumference of the body 12. Alternatively, the end portions 224c' and/or 224d' also extend around only a portion of the circumference of the body 212. Although two end portions 224 are shown as extending around only a portion of the circumference of the body 212, any number of the end portions 224 of the connector 210 can extend around only a portion of the circumference of the body 212. Moreover, the remainder of each of the elements 218 that includes an end portion 224 that extends around only a portion of the circumference of the body 212 may form a continuous closed cross sectional shape that extends completely around the adjacent radially inner element 220, or the remainder may extend around only a portion of the circumference of the adjacent radially inner element 220.

FIG. 8 is a side elevation view illustrating an exemplary alternative embodiment of a stepped connector 310. The connector 310 includes a body 312 extending a length between a pair of opposite end portions 314 and 316. The body 312 is defined by a plurality of alternating elements 318 and 320. Similar to the connector 10 (FIGS. 1, 2, and 5), in the exemplary embodiment of FIG. 8, the end portions 314 and 316 are each stepped. One of the elements 318c is separated along the circumference of the element 318c at least two different positions (only one of which can be seen in FIG. 8) along the entirety of the length of the element 318c such that the element 318c forms two separate sub-elements.

The element 318c may be separated at any two locations thereon, whether or not such locations are opposite one another. Moreover, although only one element 318c is separated into two different sub-elements, any number of the elements 318 of the body 312 may be separated into two different sub-elements. Further, some or all of the elements 318 may be separated into more than two sub-elements. In addition or alternative to the element(s) 318, one or more elements 320 may be separated into two or more sub-elements. The elements 318 and 320 may each be referred to herein as a first element, a second element, and/or a third element.

FIG. 9 is side elevation view illustrating an exemplary alternative embodiment of a stepped connector 410. The connector 410 includes a body 412 extending a length $L_3$ between a pair of opposite end portions 414 and 416. The body 412 is defined by a plurality of alternating elements 418 and 420. Similar to the connector 10 (FIGS. 1, 2, and 5), in the exemplary embodiment of FIG. 9, the end portions 414 and 416 are each stepped. A passageway 417 extends through the length $L_3$ of the body 412. In the exemplary embodiment, the passageway 417 is defined by the radially innermost element, which in the exemplary embodiment is an element 420. Alternatively, the radially innermost element is an element 418. Moreover, the passageway 417 may be defined between any two adjacent elements 418 and 420, such that the passageway 417 is not defined by the radially innermost element. When the passageway 417 is not defined by the radially innermost element, but rather is defined between two adjacent elements 418 and 420 neither of which is the radially innermost element, the passageway 417 will only extend through a portion of the length $L_3$ of the body 412 because at least one of the two adjacent elements only extends for a portion of the length $L_3$ of the body 412. The passageway 417 may facilitate withdrawing and/or delivering fluid and/or solid substances. For example, the connector 410 may be used with a catheter to withdraw and/or deliver fluid and/or solid substances from/into a body cavity. The passageway 417 may also be used to carry surgical or other tools, such as, but not limited to, an imaging catheter, an ablation catheter, a drive coil, a guide wire, a catheter, a stationary transducer, a spinning transducer, a sensor and/or detector, a stationary optical material, a spinning optical material, other mechanical and/or electrical tools, and/or the like. Moreover, in some embodiments the passageway 417 may include a plurality of lumens such that the passageway 417 is divided into a plurality of passageways. As used herein, the term "connector" includes a structure that only connects to, or forms, the end of another structure (such as, but not limited to, a catheter, a probe, a sensor, and/or the like) instead of interconnecting two components. The elements 418 and 420 may each be referred to herein as a first element, a second element, and/or a third element.

Figure 10:
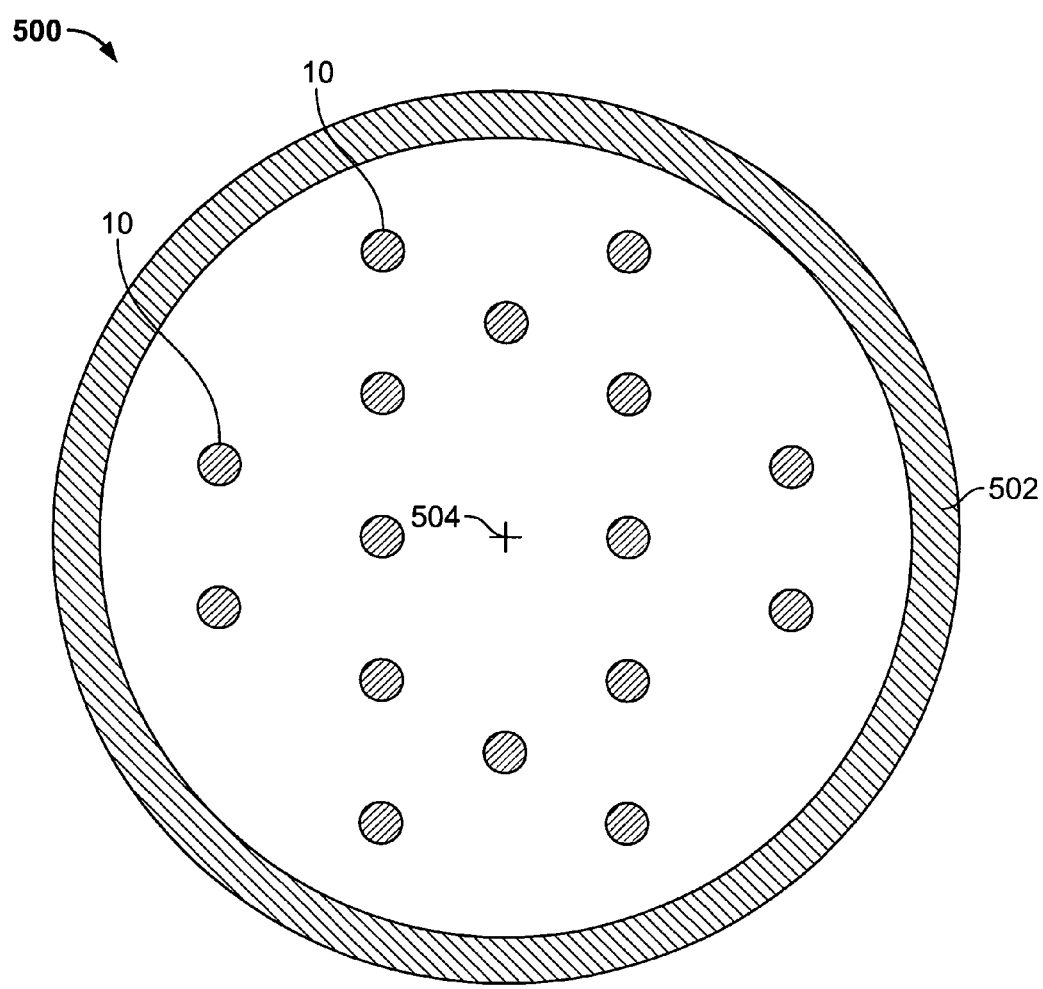
FIG. 10 is a cross sectional view of an exemplary embodiment of a circular electrical connector assembly.

FIG. 10 is a cross sectional view of an exemplary embodiment of a circular connector assembly 500. The connector assembly 500 includes a housing 502 that holds a plurality of the connectors 10. The connectors 10 are positioned in an arrangement about a common central longitudinal axis 504 of the housing 502. Although the housing is only shown to hold the connectors 10, the housing may also hold one or more conventional electrical and/or optical contacts/elements that are not stepped. Moreover, although the housing 502 is circular in the exemplary embodiment, the housing 502 may have any other suitable shape. The housing 502 may hold any number of the connectors 10.

FIG. 13 is a cross sectional view of an exemplary alternative embodiment of a stepped connector 810 and a stepped connector 850 for use with the stepped connector 810. The connector 810 includes a body 812 extending a length along a central longitudinal axis 822 of the body 812 between a pair of opposite end portions 814 and 816. The body 812 is defined by a plurality of alternating elements 818 and 820. Similar to the connector 10 (FIGS. 1, 2, and 5), in the exemplary embodiment of FIG. 13 the end portions 814 and 816 are each stepped. However, the end portions 14 and 16 of the connector 10 are stepped completely outwardly such that, beginning with the radial outermost element 18e and moving radially inwardly, each element 18 and 20 has a greater length at the end portions 14 and 16 than the previous element. In contrast to the connector 10, at the end portion 814 the connector 810 includes an element 818a that is stepped inwardly. Specifically, the element 818a has a shorter length at the end portion 814 than the element 818b, which is positioned radially outwardly from the element 818a, such that end portion 824b of the element 818b extends a greater length along the body 812 than an end portion 824a of the element 818a.

Although the radially innermost element 818a is stepped inwardly in the embodiment shown in FIG. 13, additionally or alternatively one of the other elements 818b, 818c, 820a, and/or 820b is stepped inwardly. Although in the exemplary embodiment of FIG. 13 the end portion 816 of the connector body 812 is stepped completely outwardly similar to the connector 10, alternatively the end portion 816 of the connector body 812 may include one or more elements 818 or 820 that are stepped inwardly. In the exemplary embodiment of FIG. 13, the element 818a includes an optional passageway 817 defined therein. An insulating cover 819 extends around the connector body 812 along a portion of the length of the connector body 812. The elements 818 and 820 may each be referred to herein as a first element, a second element, and/or a third element. The end portions 824 may each be referred to herein as a first and/or a second end portion.

The connector 850 includes a body 852 that extends a length along the central longitudinal axis 822 between a pair of opposite end portions 856 and 858. The body 852 includes a plurality of elements 860. In some embodiments, for example when an element 860 is selected as electrically conductive or optically transmissive, the element 860 is positioned along the length of the body 852 such that the element 860 is configured to engage the end portion 824 of a corresponding one of the elements 818 when the connector 810 is mated with the connector 850. However, in other embodiments, for example when an element 860 is selected as an insulator, the element 860 may not engage the end portion 824 of the corresponding element 818 when the connector 810 is mated with the connector 850. The body 852 also includes a plurality of elements 868. In some embodiments, for example when an element 868 is selected as electrically conductive or optically transmissive, the element 868 is positioned to engage the end portion 826 of a corresponding one of the elements 820 when the connector 810 is mated with the connector 850. However, in other embodiments, for example when an element 868 is selected as an insulator, the element 868 may not engage the end portion 826 of the corresponding element 820 when the connector 810 is mated with the connector 850. An insulating cover 851 extends around the connector body 852 along a portion of the length of the connector body 852. In the exemplary embodiment of FIG. 13, a radially innermost element 860a includes a passageway 821 that communicates with the passageway 817 when the connectors 810 and 850 are mated together.

The embodiments described herein may provide a connector having a reduced size for a given number of connections or an increased number of connections for a given size. The embodiments described herein may provide a connector capable of connecting an increased number of signal and/or power transmissions. The embodiments of stepped end portions described herein expose elements (such as, but not limited to, elements 18 and/or 20) of a connector to enable direct access to the elements for terminating an electrical component (such as, but not limited to, a cable and/or a wire), for mating the connector with another connector, and/or for chemical, electrical, mechanical, and/or optical interaction of the elements with other components, elements, structures, and/or the like.

Exemplary embodiments are described and/or illustrated herein in detail. The embodiments are not limited to the specific embodiments described herein, but rather, components and/or steps of each embodiment may be utilized independently and separately from other components and/or steps described herein. Each component, and/or each step of one embodiment, can also be used in combination with other components and/or steps of other embodiments. When introducing elements/components/etc. described and/or illustrated herein, the articles "a", "an", "the", "said", and "at least one" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc. Moreover, the terms "first," "second," and "third," etc. in the claims are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

While the invention has been described in terms of various specific embodiments, those skilled in the art will recognize that the invention can be practiced with modification within the spirit and scope of the claims.

What is claimed is:

1. A connector comprising:
a body extending a length along a central longitudinal axis, the body comprising:
a plurality of first and second elements each comprising opposite first and second end portions;
a third element positioned between at least a portion of the first and second elements, a portion of the third element and a portion of the first element extending within the second element, a portion of the first element extending within the third element, the first end portions of the first and second elements being exposed with respect to the third element, the second end portions of the first and second elements being exposed with respect to the third element, the exposed first end portions of the first and second elements being spaced apart with respect to each other along the length of the body, the exposed second end portions of the first and second elements being spaced apart with respect to each other along the length of the body, each of the first and second elements having a stepped end portion located at a different position along the length of the body, the length of the body extending no greater than approximately 152 millimeters (approximately 6 inches); and
a passageway extending through at least a portion of the length of the body, said passageway configured for insertion and withdrawal of fluids, solid substances, tools, or lumens.

2. The connector according to claim 1, wherein the length of the body extends no greater than approximately 102 millimeters (approximately 4 inches).

3. The connector according to claim 1, wherein the length of the body extends no greater than approximately 38 millimeters (approximately 1.5 inches).

4. The connector according to claim 1, wherein at least one of the first and second elements is electrically conductive.

5. The connector according to claim 1, wherein at least one of the first and second elements comprises an optical material.

6. The connector according to claim 1, wherein the third element comprises an optical material or is electrically conductive.

7. The connector according to claim 1 wherein the passageway extends through the first element.

8. The connector according to claim 1, wherein the first, second, and third elements are concentrically aligned with respect to each other.

9. A connector assembly comprising:
a housing; and
a plurality of connectors held by the housing in an arrangement about a common central longitudinal axis of the housing, at least one of the plurality of connectors comprising:
a body comprising (a) a plurality of first and second elements and a third element positioned between at least a portion of the first and second elements, a portion of the third element and a portion of the first element extending within the second element, a portion of the first element extending within the third element, end portions of the first and second elements being exposed with respect to the third element, a portion of the third element separating the exposed end portions of the first and second elements along a length of the body such that the exposed end portions of the first and second elements are spaced apart with respect to each other along the length of the body, each of the first and second elements having a stepped end portion located at a different position along the length of the body; and (b) a passageway extending through at least a portion of the length of the body, said passageway configured for insertion and withdrawal of fluids, solid substances, tools, or lumens.

10. The connector assembly according to claim 9, wherein at least one of the first and second elements is electrically conductive.

11. The connector assembly according to claim 9, wherein at least one of the first and second elements comprises an optical material.

12. The connector assembly according to claim 9, wherein the third element comprises an optical material or is electrically conductive.

13. The connector assembly according to claim 9, wherein the housing has a cylindrical shape such that the connector assembly is a circular connector assembly.

14. A connector comprising:
a body comprising
(a) a plurality of first and third elements, a portion of the first element extending within the third element, end portions of the first and third elements being exposed with respect to each other, the exposed end portions of the first and third elements being spaced apart with respect to each other along a length of the body, each of the first and third elements having a stepped end portion located at a different position along the length of the body, one of the first and third elements being electrically conductive and the other of the first and third elements comprising an optical material; and
(b) a passageway extending through at least a portion of the length of the body, said passageway configured for insertion and withdrawal of fluids, solid substances, tools or lumens.

15. The connector according to claim 14, further comprising a second element, wherein a portion of each of the first and third elements extends within the second element.

16. The connector according to claim 15, wherein the first element is electrically conductive, the third element comprises an optical material, and the second element is electrically conductive.

17. The connector according to claim 15, wherein the first element comprises an optical material, the third element is electrically conductive, and the second element comprises an optical material.

* * * * *